Nov. 25, 1947.   L. P. CRONVALL   2,431,311
BATTERY CHARGING SYSTEM
Filed Dec. 6, 1944   2 Sheets-Sheet 1

Inventor
Lars Per Cronvall

Patented Nov. 25, 1947

2,431,311

UNITED STATES PATENT OFFICE 2,431,311

BATTERY CHARGING SYSTEM

Lars Per Cronvall, Stockholm, Sweden, assignor to International Standard Electric Corporation, New York, N. Y.

Application December 6, 1944, Serial No. 566,887
In Sweden December 8, 1943

5 Claims. (Cl. 320—10)

This invention relates to charging of batteries having a voltage sensitive load which may be intermittently connected thereto, particularly of the type in which the charging takes place from an A. C. supply over a rectifier.

One object of the invention is to provide an improved battery charging control permitting high speed charging at increased voltage without subjecting the load to detrimental voltages.

Another object is to provide a control system of this kind automatically preventing supercharging of the battery.

With the above and other objects in view the invention consists in the combination and arrangement of parts hereinafter fully described and illustrated in the accompanying drawings and pointed out in the claims hereunto appended.

The invention is diagrammatically illustrated by way of example in the acompanying drawings in which Fig. 1 is a circuit arrangement embodying one form of my invention.

Figure 1:
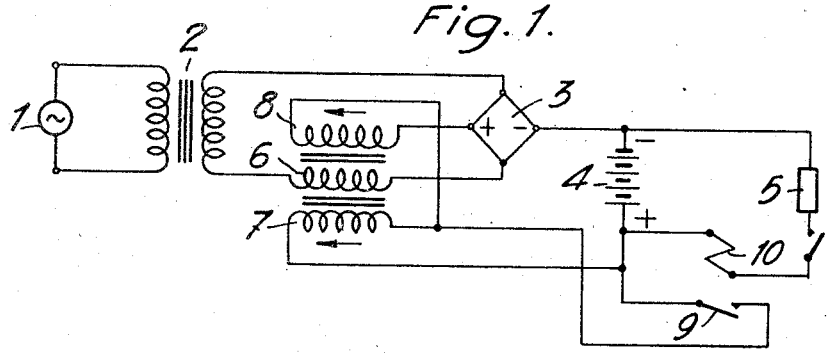

In all of the figures on the drawing 1 represents an A. C. supply and 2 a transformer for delivering alternating current from supply 1 to a dry rectifier 3 charging an accumulator battery 4 having a load 5 adapted to be connected and disconnected therefrom.

For controlling the charging in the embodiment shown in Fig. 1 there is used a saturable core reactor arrangement having an inductance 6 passing the alternating current and two direct current exciting windings 7 and 8 connected in series aiding when the load is off and traversed by the direct current output of rectifier 3. The D. C. winding 7 can be short-circuited by a contact 9 which by means of a relay 10 is so dependent on the external load 5 that it is open when the external load is off and closed when said load is on. In the former case the A. C. and D. C. ampere-turns of reactor 6, 7, 8 are of equal order of magnitude and so related as to secure the desired charging voltage regulation. Upon disconnecting the external load 5 winding 7 is effectively connected in circuit and the D. C. excitation of the reactor increases resulting in a decrease of the inductance of coil 6 whereby the voltage of the rectifier increases to secure the desired high speed charging of battery 4. This voltage will, however, be dependent on the value of the charging current flowing through windings 7 and 8 so that when said current during the course of charging falls below a predetermined limit the charging voltage is automatically reduced to a value preventing supercharging of battery 4.

Figure 2:
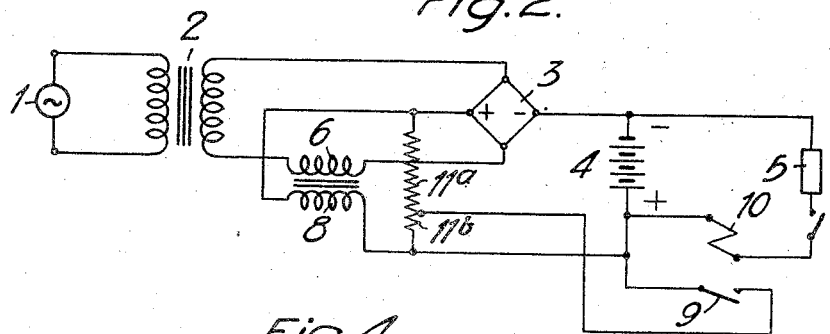
Fig. 2 is a modification of Fig. 1.

Fig. 2 shows a similar arrangement differing from that illustrated in Fig. 1 only in the respect that two resistances 11$^a$ and 11$^b$ connected in series are in combination connected in parallel to winding 8. Resistance 11$^b$ can be short-circuited at contact 9. The mode of operation is substantially equal to that set forth with reference to Fig. 1.

Figure 3:
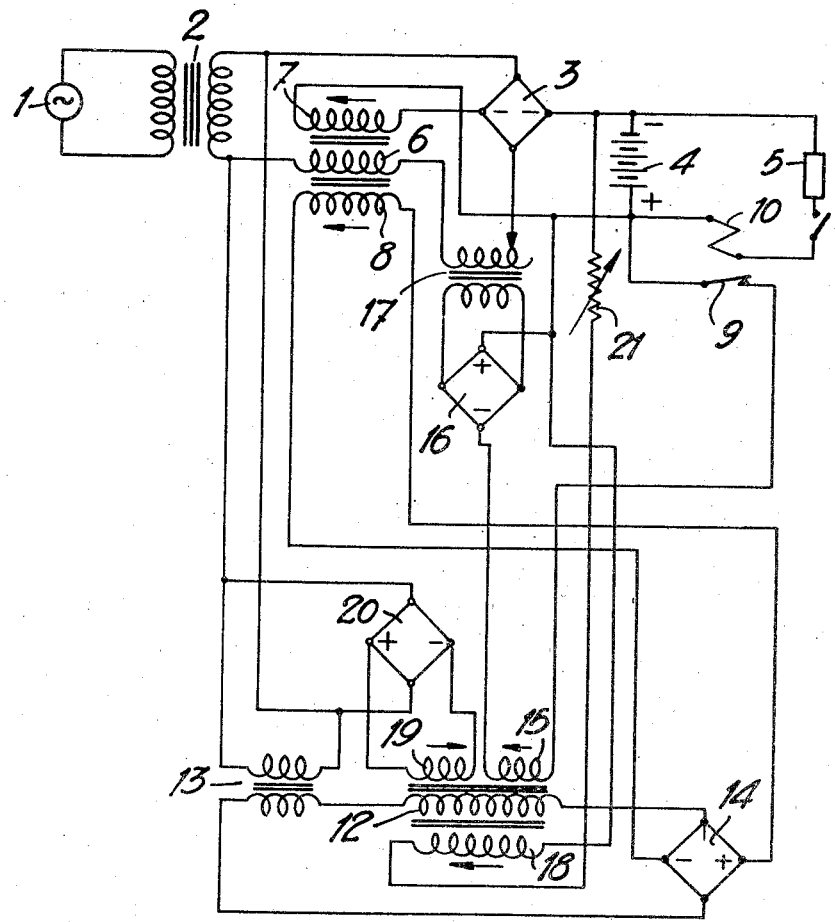
Fig. 3 is a circuit diagram illustrating a second embodiment of my invention with additional control facilities.

The embodiment illustrated in Fig. 3 comprises an auxiliary saturable core reactor arrangement including an inductance 12 traversed by alternating current derived from the input of rectifier 3 over transformer 13 and supplying winding 8 of the main reactor 6, 7, 8 over rectifier 14. At 15 there is shown a D. C. excitation winding for the auxiliary reactor supplied with current from a rectifier 16 receiving A. C. from the input of rectifier 3 over transformer 17. In addition the auxiliary reactor comprises a D. C. excitation winding 18 connected across the output of rectifier 3 and a D. C. excitation winding 19 for compensating voltage variations of supply 1 and fed with D. C. from a rectifier 20 connected across the input of transformer 13.

In this embodiment contact 9 is supposed to be open when the load is on and by means of resistance 21 the output voltage of rectifier 3 with the load 5 on can be adjusted to any desired value which by suitable proportioning of the auxiliary reactor 12 can be maintained with the desired accuracy, such as ±1%, such accuracy being frequently required, for instance, in the operation of telephone systems.

When the load 5 is dis-connected contact 9 closes and the auxiliary reactor 12 is thereby through winding 15 operated by an additional exciting voltage from rectifier 16 proportional to the charging current. Winding 8 is thereby subjected to an additional control action whereby the excitation of the main reactor resulting therefrom and consequently the entire excitation thereof increases resulting in an increased charging voltage and charging current. The charging operation then continues substantially in the manner described with reference to Fig. 1.

Figure 4:
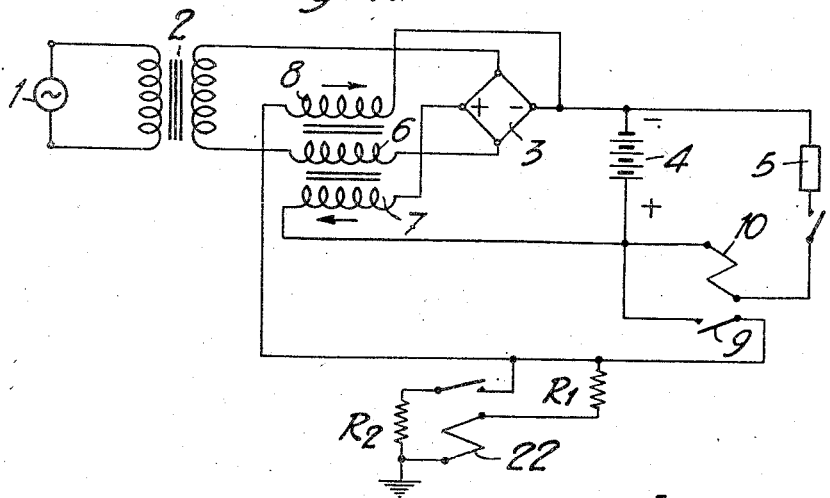
Fig. 4 is a circuit scheme of a third embodiment of my invention.

In the arrangement illustrated in Fig. 4 exciting winding 8 is connected in parallel to the battery 4 when contact 9 is closed and as regards its exciting effect acts in opposition to winding 7. In addition a voltage relay 22 and two resistances R1 and R2 are provided. With the external load 5 on and contact 9 closed constant charging voltage regulation will be secured by means of reactor 6, 7, 8. When the load 5 is disconnected and contact 9 thus opened the direct current through winding 8 will also pass through resistance R1 and winding of relay 22 resulting in a decrease of the current through winding 8, whereupon the resulting excitation of reactor 6, 7, 8 will increase whereby the charging voltage rises. When the latter has reached a predetermined value relay 22 pulls up and connects resistance R2 in circuit, whereby the charging voltage is reduced to the desired value preventing supercharging of the battery.

What I claim is:

1. An arrangement for controlling the continuous charging of an accumulator battery from an A. C. supply over a rectifier said rectifier being continuously connected to said A. C. supply and to said battery for charging said battery by uninterrupted circuits comprising a choke coil connected in circuit at the A. C. side of said rectifier for limiting the charging voltage to a value harmless to a load connected in circuit with said battery, further characterized by the provision of means to control the voltage of said choke coil, said means being connected to the output circuit of said rectifier to increase the charging voltage in response to the disconnection of said load.

2. An arrangement according to claim 1 wherein said control with said load off is so dependent on the charging current that the charging voltage is automatically reduced when the charging current falls below a predetermined value.

3. An arrangement according to claim 1 wherein said means to control comprises a D. C. excitation circuit for said choke coil and a contact for controlling said excitation circuit, said contact being operated in response to the connection and disconnection of said load.

4. An arrangement according to claim 1 wherein said means to control comprises a D. C. excitation circuit for said choke coil, an auxiliary choke coil controlling said excitation circuit and provided with a D. C. excitation circuit and a contact for controlling said lastmentioned excitation circuit, said contact being operated in response to the connection and disconnection of said load.

5. An arrangement according to claim 1 wherein said means to control comprises a D. C. excitation circuit for said choke coil, a two position contact under the control of said load and a relay, said relay in one position of said contact being under the influence of the battery voltage for regulating said excitation circuit.

LARS PER CRONVALL.

REFERENCES CITED

The following references are of record in the file of this patent:

UNITED STATES PATENTS

| Number | Name | Date |
| --- | --- | --- |
| 1,791,159 | Beetem | Feb. 3, 1931 |
| 1,916,307 | Gilson | July 4, 1933 |